United States Patent [19]
Watts

[11] 3,948,305
[45] Apr. 6, 1976

[54] TIRE BEAD RETAINER AND METHOD OF INSTALLATION

[75] Inventor: George T. Watts, North Canton, Ohio

[73] Assignee: The Goodyear Tire & Rubber Company, Akron, Ohio

[22] Filed: June 9, 1975

[21] Appl. No.: 585,325

[52] U.S. Cl. .................................... 157/1; 152/400
[51] Int. Cl.² ........................................... B60C 5/16
[58] Field of Search ........ 152/400; 157/1, 1.1, 1.17, 157/1.21, 1.33

[56] References Cited
UNITED STATES PATENTS

| | | | |
|---|---|---|---|
| 2,381,382 | 8/1945 | Hale | 152/400 |
| 2,440,740 | 5/1948 | Daddio | 152/400 |
| 3,780,784 | 12/1973 | Spier | 157/1 |

*Primary Examiner*—Al Lawrence Smith
*Assistant Examiner*—James G. Smith
*Attorney, Agent, or Firm*—F. W. Brunner; M. L. Gill; Frederick K. Lacher

[57] ABSTRACT

A bead retention system for mounting and retaining tires on a rim in which a band of resilient flexible material has a series of transverse bead separators mounted along its length at spaced-apart positions. The band has a length and configuration in the unstressed condition for positioning in a tire cavity prior to mounting of the tire on the rim. A cable connecting the ends of the band extends through a ratchet locking member and may be inserted through the valve hole of the rim whereby the band can be pulled down and locked in position around the rim after mounting of the tire on the rim.

10 Claims, 7 Drawing Figures

TIRE BEAD RETAINER AND METHOD OF INSTALLATION

Heretofore bead separators have been devised which had a ring carrying the transverse separator plates and which required a special type of split rim for installation. Segmental ring bead separators have also been provided with hinged connections between the segments and a connecting strap to pull the ends together; however, the installation and locking of the ring in position has required inserting of the separators into the tire chamber after the tire is partially mounted on the rim and connecting the strap to a shortening device in the wheel well. In order to alleviate the problems of mounting the bead separator, bead separator segments have been resiliently mounted on one bead of a tire and pulled down into position between the beads by a wire after the tire is mounted on the rim.

The method of installing these bead separators has also required special manufacturing techniques or has involved processes not suitable for mounting of standard tires on standard drop center rims. For example, in automobile assembly plants, automatic tire mounting machines are used and the time required for mounting tires is increased substantially if a bead separator of the type used heretofore is to be installed. Also, in tire stores or service stations, it has been found that installation and removal of tires with bead separators has caused problems by increasing the time necessary to perform the operations while at the same time requiring substantially greater safety precautions to avoid injury to the operator's hands and fingers.

It is a principal object of this invention to provide a tire bead retainer having a flexible resilient band which may be deflected for insertion in a tire cavity and for mounting on a rim.

Another object is to provide an improved method of mounting the bead retainer and tire on a rim.

A further object is to provide for pulling the ends of the resilient band together after the tire is mounted on the rim.

A still further object is to provide for storing the bead retainer in the tire cavity prior to mounting the retainer on the rim.

Another object is to provide for locking the resilient band in position on the rim.

A further object is to provide a method for positioning the retainer in an annular well of a rim.

A still further object is to provide a method for positioning the retainer on a rim with a cable extending through a valve hole in the rim.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
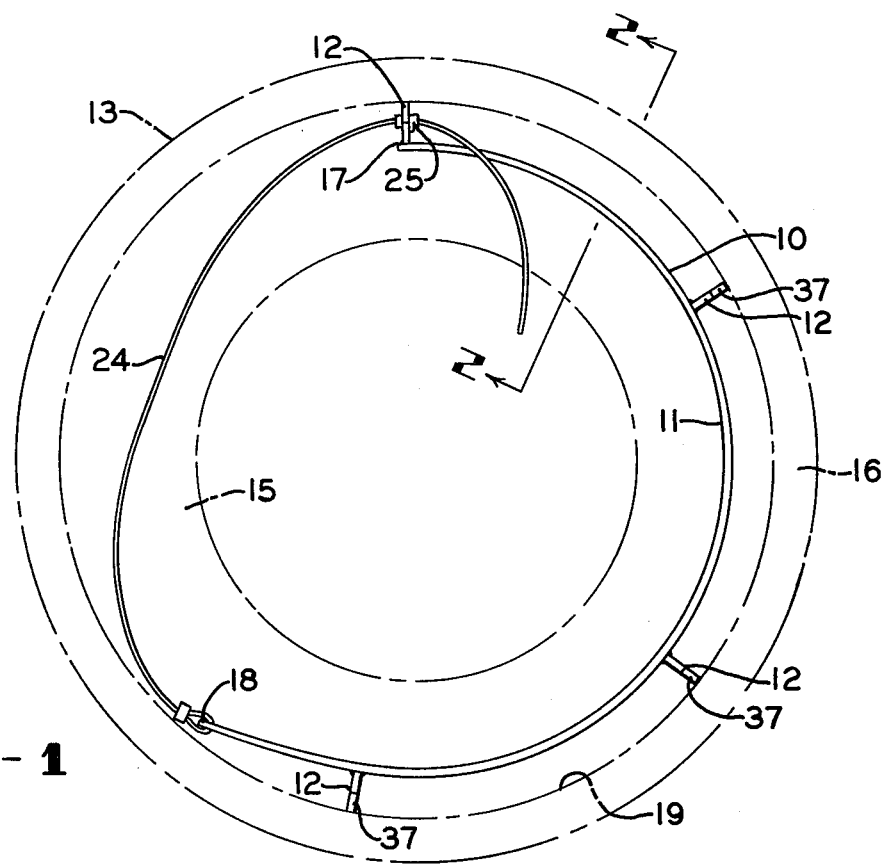
FIG. 1 is an elevation of a tire bead retainer embodying the invention shown in position within a tire before mounting on a rim, the tire tread portion and bead portions of the tire being shown in chain dotted lines.
Figure 2:
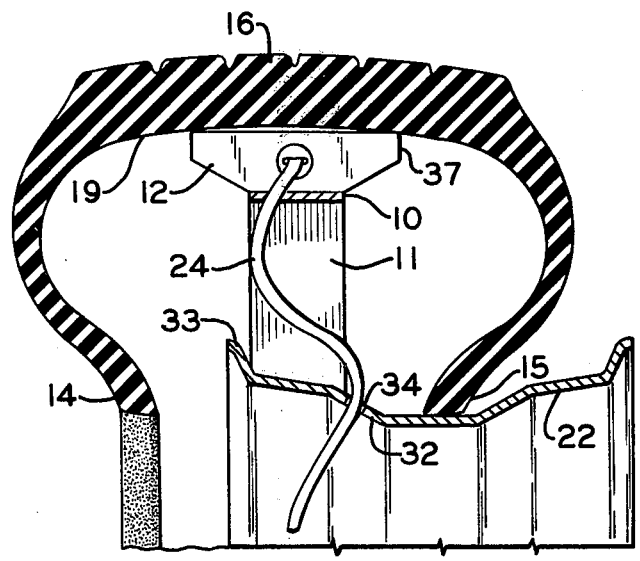
FIG. 2 is a fragmentary sectional view taken along the plane of line 2—2 of FIG. 1 showing the tire partially mounted on the rim and one step in mounting the retainer in the wheel well.

Referring to the drawings and particularly to FIGS. 1 and 2, a tire bead retainer 10 is shown which has an elongated band 11 of resilient metal such as steel which may be in the form of a flat strip. Transverse bead separators such as plates 12 which may also be of a metal such as steel are mounted as by welding on the band 11 at spaced-apart positions longitudinally of the band.

As shown in FIGS. 1 and 2, the retainer 10 is positioned in a tire 13 having beads 14 and 15 and a crown portion 16. The band 11 has end portions 17 and 18 which are spaced apart a predetermined distance in the unstressed condition so that upon insertion of the retainer 10 into the tire 13, the band 11 will expand to the position shown in FIG. 1 with the plates 12 engaging the crown portion 16 of the tire 13 at an inner wall 19. The retainer 10 in this position is self-storing and can be transported with the tire to a location where the tire may be mounted on a drop center rim 22 of a wheel 23 such as that shown in FIG. 4.

Figure 5:
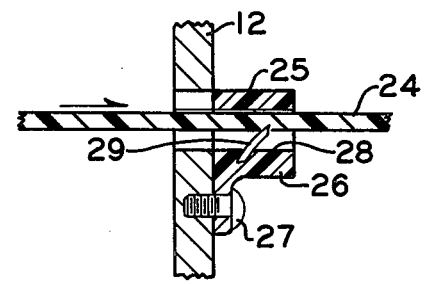
FIG. 5 is an enlarged fragmentary sectional view of the cable gripping apparatus taken along the plane of line 5—5 of FIG. 3.

The end portions 17 and 18 of the band 11 are connected by a flexible cable member such as a plastic tie 24 which may be looped through a hole in the end portion 18 and extend through a locking member such as one-way ratchet member 25 at the other end portion 17. The ratchet member 25, which is shown in greater detail in FIG. 5, may have a plastic mounting base 26 which is fastened to the plate 12 at the end portion 17 of band 11 as by a screw 27 threaded in the plate. The base 26 has an opening 28 through which the tie 24 passes and a spring blade 29 of steel or other sharp, hard resilient material is mounted in the opening at an angle to provide for movement of the tie in one direction only and to lock the tie in position by preventing movement in the opposite direction. As shown in FIG. 5, the tie 24 may be pulled through the ratchet member 25 in a direction to the right; however, any movement to the left is prevented by the blade 29 engaging the surface of the tie and locking it in position.

The tire bead retainer 10 of this invention is part of a system for mounting and retaining tires on a rim 22. This system includes the method of contacting the band 11 by bringing the end portions 17 and 18 together so that the retainer 10 can be inserted into the cavity within tire 13. The end portions 17 and 18 are then released and the resiliency of the band 11 causes the retainer 10 to expand and take a position with the plates 12 engaging the inner wall 19 of the tire. In this embodiment, the diameter of the band 11 in the unstressed condition is greater than the diameter of the inner wall 19 of the tire.

With the retainer 10 stored in the tire 13 in the condition shown in FIG. 1, the tire may be mounted on the rim 22 as shown in FIG. 2. The rim 22 has an annular well 32 and a portion of the bead 15 is placed in the wheel well after which the remainder of the bead is pulled over a flange 33 of the rim and into the position shown in FIG. 2. It is then a relatively simple operation for the operator to reach inside the tire 13, grasp the end of the tie 24 and insert it through a valve hole 34 in the rim 22.

Figure 3:
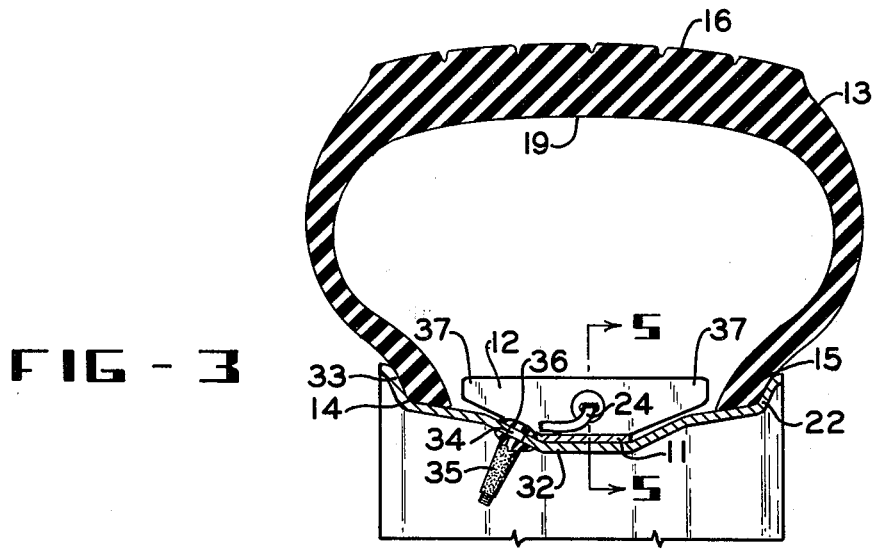
FIG. 3 is a sectional view like FIG. 2 showing the bead retainer and tire mounted on the rim.
Figure 4:
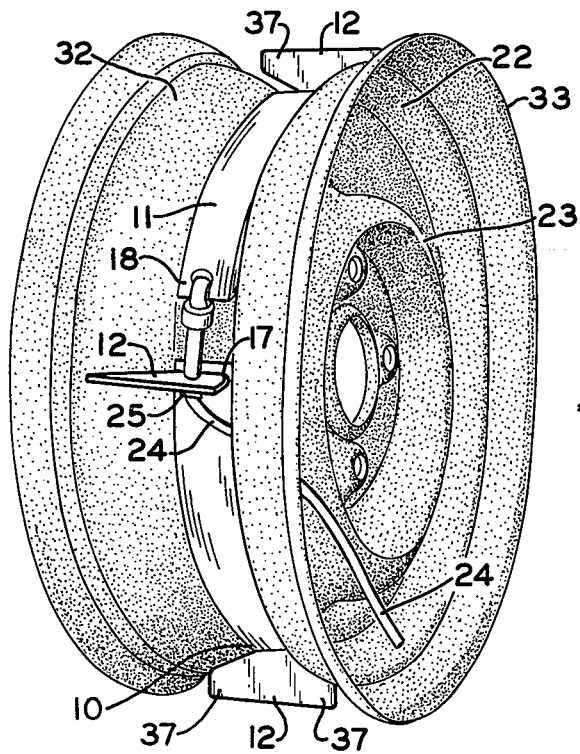
FIG. 4 is a perspective view of the wheel showing the bead retainer mounted in position on the rim.

Following this operation, the bead 15 is moved out of the wheel well 32 and a portion of the other bead 14 is placed in the well which permits the rest of the bead 14 to be pulled over the flange 33 into the well. Thereafter, both beads 14 and 15 are moved into the position shown in FIG. 3 as by injecting air into the tire cavity through the valve hole 34 in the rim 22. The tire 13 is then deflated and the bead retainer 10 contracted by pulling on tie 24 as shown in FIG. 4. As the tie 24 is pulled through the ratchet member 25 into the position with the band 11 wrapped around the wheel well 32, the tie is locked in position by the blade 29 as shown in FIG. 5. After reaching this locked position, a portion of the tie 24 extending through the valve hole 34 may be cut off and pushed back through the hole into the tire cavity. A valve 35 having a resilient end portion 36 at one end may be pushed through the valve hole 34 and snapped into sealing condition with the rim 22 whereupon the tire 13 may be reinflated.

As shown in FIG. 4, the end portions 17 and 18 of the band 11 are spaced apart in the contracted position of the retainer 10 and preferably the band has a length slightly less than the circumferential distance around the rim 22 at the wheel well 32. The width of the band 11 also is less than the width of the wheel well 32 for seating firmly in the well.

In the event of a puncture or blowout, the beads 14 and 15 of the tire 13 will be prevented by the plates 12 from becoming unseated from the bead seats on the rim 22 and entering the wheel well 32 which could result in dismounting of the tire. Opposing edges 37 of the plates 12 are positioned close to the beads 14 and 15 as shown in FIG. 3 and thereby prevent movement of the beads out of the bead seats on the rim or into the wheel well 32.

Removal of the tire 13 and bead retainer 10 from the rim 22 may be accomplished by pulling the valve 35 out of valve hole 34, inserting a tool into the tire cavity and cutting the tie 24 so that the band 11 may expand into the position shown in FIGS. 1 and 2 with the plates 12 in engagement with the inner wall 19 of the tire. The tire 13 may then be removed by urging a portion of bead 14 into the wheel well 32 permitting the rest of the bead to be pulled over the flange 33 whereupon a portion of the other bead 15 may be moved into the wheel well and the rest of that bead pulled over the flange of the rim. After the tire 13 has been removed, the bead retainer 10 may be removed from the tire by reaching inside the tire cavity, contracting the retainer and pulling it out of the tire.

Figure 6:
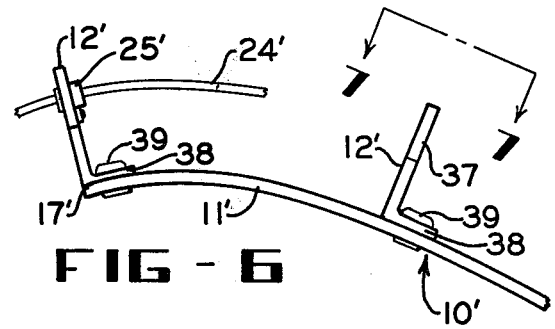
FIG. 6 is a fragmentary view like FIG. 1 of a modification in which the band is of fiberglass reinforced plastic instead of steel.
Figure 7:
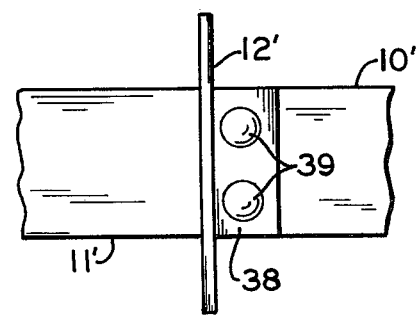
FIG. 7 is a fragmentary detailed view of the separator connected to the retainer band taken along the plane of line 7—7 in FIG. 6.

Referring to FIGS. 6 and 7, a modification is shown in which the band 11 is of a different resilient flexible material and in this case is a band 11' of fiberglass reinforced plastic in the form of a flat strip. The material of the band 11' is also resilient and flexible to provide the properties of the invention wherein the band 11' may be contracted for insertion into the tire cavity and then released for expansion into engagement with the inner wall 19 of the tire. The plates 12' have flanges 38 and may be fastened to the band 11' of fiberglass reinforced plastic by rivets 39. In all other respects, the bead retainer 10' with the fiberglass reinforced plastic band 11' and plates 12' has the same construction as the bead retainer 10 described hereinabove. A ratchet member 25' is mounted on the plate 12' at the end portion 17' of the band 11' and a tie 24' may be extended through a hole in the plate 12' and the ratchet member 25' for connection to the other end portion 18' (not shown).

While certain representative embodiments and details have been shown for the purpose of illustrating the invention, it will be apparent to those skilled in the art that various changes and other modifications may be made therein without departing from the spirit or scope of the invention.

What is claimed is:

1. A tire bead retainer for positioning in an annular well of a wheel rim comprising an elongated band of resilient flexible material having a width not greater than the width of said well permitting radial movement of said band into said well, transverse bead separators mounted at spaced-apart positions, longitudinally of said band, each of said separators extending radially outward from said well to resist movement of tire beads mounted on said wheel rim into said wheel well, said band having end portions spaced apart a predetermined distance in the unstressed condition with one of said end portions being movable toward the other of said end portions for insertion of said retainer into the cavity of a tire, said predetermined distance between said end portions of said band in the unstressed condition causing resilient movement of said end portions apart after insertion into said tire to a position in which said band has a diameter greater than the diameter of said well for ease of mounting said tire on said rim, means for moving one of said end portions towards the other of said end portions and into said wheel well with said bead separators positioned between the beads on said tire, and said wheel rim having an opening and said means for moving said band into said wheel well including a cable member fastened to said band at a first position and a cable locking member mounted on said band at a second position spaced apart from said first position with said cable passing through said locking member and adaptable to be extended through said opening in said wheel rim for pulling said cable member through said locking member to reduce the distance between said first position and said second position whereby said band is wrapped around said rim in said wheel well.

2. A tire bead retainer according to claim 1 wherein said tire has an inner wall and said end portions are resiliently movable apart with said bead separators into engagement with said inner wall of said tire for self-storage of said retainer in said tire during mounting of said tire on said rim.

3. A tire bead retainer according to claim 1 wherein said band has a length between said end portions which is less than the circumference of said rim in said well, said first position on said band is at one of said end portions and said second position on said band is at the other of said end portions whereby upon pulling of said cable member through said locking member said end portions converge wrapping said band around said rim in said wheel well.

4. A tire bead retainer according to claim 1 wherein said band is a flat strip of resilient metal.

5. A tire bead retainer according to claim 4 wherein said band is a flat strip of fiberglass reinforced plastic.

6. A tire bead retainer according to claim 1 wherein said locking member includes a one-way ratchet member for engaging and holding said cable member as it is pulled through said locking member whereby said band is held in said wrapped condition in said wheel well and said cable member can be pushed into the tire cavity through said opening in said rim and a valve mounted in said opening for inflating the tire.

7. A method for positioning on a wheel rim a tire bead retainer having an elongated band of resilient flexible material and end portions spaced apart a predetermined distance in the unstressed condition of the band comprising moving one of said end portions towards the other of said end portions, inserting said band in the space within a tire, releasing said end portions for movement radially outward of said tire into engagement with an inner wall of said tire, mounting a first bead portion of said tire on said rim, passing a member connecting said end portions of said band through an opening in said rim, mounting a second bead portion of said tire on said rim, pulling said member connecting said end portions through said opening in said rim to draw one of said end portions towards the other of said end portions for moving said band around said rim, locking said band in position, inserting said member in the tire cavity through said opening in said rim and closing said opening for inflation of said tire.

8. A method for positioning a tire bead retainer according to claim 7 wherein said member connecting said end portions is a cable and said locking of said band in said well is provided by a one-way ratchet member on one of said end portions of said band through which said cable passes.

9. A method for positioning a tire bead retainer according to claim 7 wherein said opening in said rim is closed by inserting a valve stem through which air under pressure can be adjusted into the tire cavity.

10. A method for positioning a tire bead retainer according to claim 7 wherein said wheel rim has an annular well in which said bead retainer is positioned, said mounting of said first bead portion including moving part of said first bead portion into said wheel well and pulling the remainder of said first bead portion over a flange on said rim and then moving said first bead portion out of said wheel well, said mounting of said second bead portions including moving a part of said second bead portion into said wheel well and pulling the remainder over said flange and then moving said second bead portion out of said wheel well, and wherein said moving of said band around said rim includes moving said band into locked position in said wheel well.

* * * * *